Patented Oct. 8, 1940

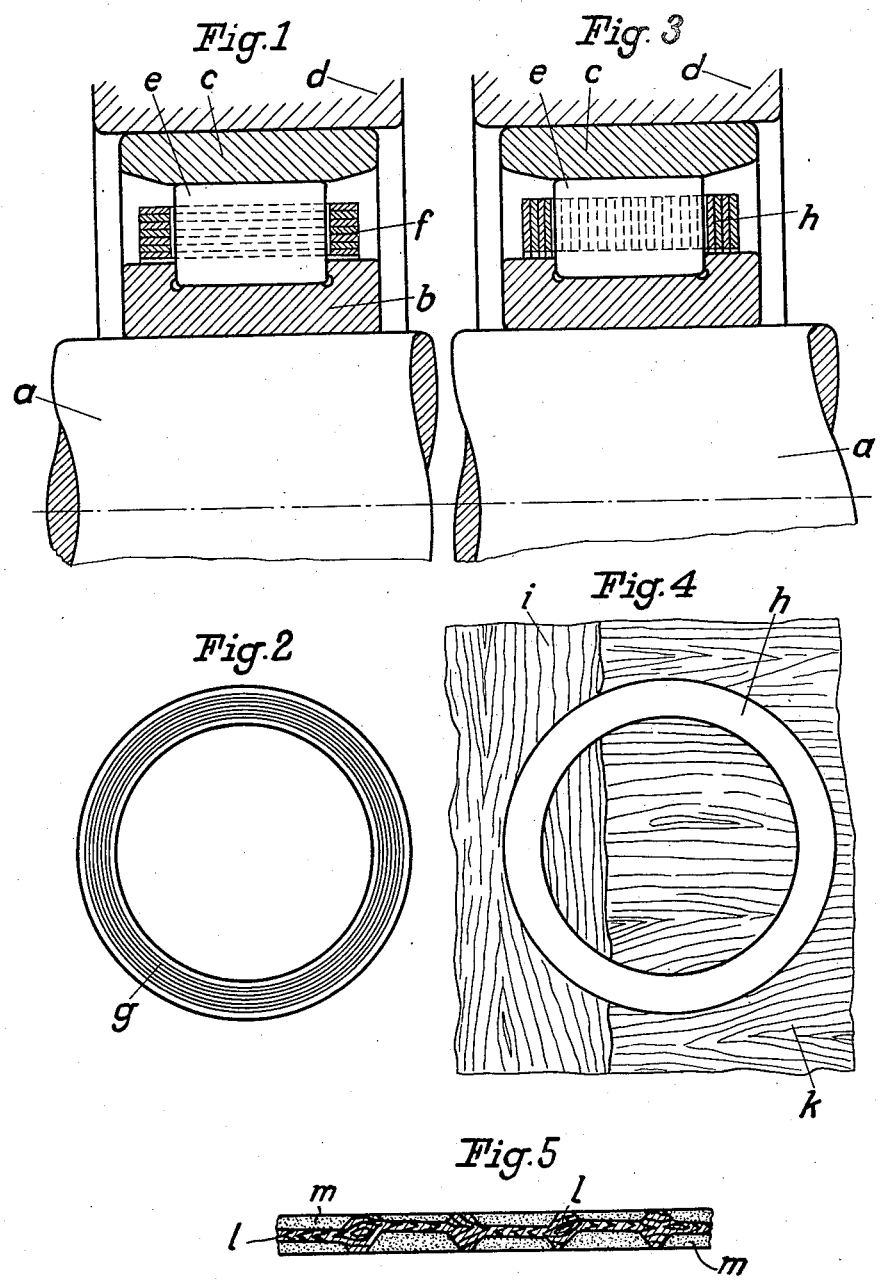

2,217,259

UNITED STATES PATENT OFFICE 2,217,259

CAGE FOR ROLLER BEARINGS

Ernst Schack, Schweinfurt, Germany

Application December 30, 1938, Serial No. 248,613
In Germany November 9, 1935

6 Claims. (Cl. 308—217)

This invention relates to cages for the rolling elements of anti-friction bearings and to methods of producing such cages. Normally cages for the rolling elements of ball and roller bearings are made of metal and the manufacture thereof consequently involves expensive and complicated manufacturing processes.

An object of the present invention is to provide a non-metallic construction which will enable the manufacture of such cages to be cheapened and simplified to a high degree, whilst at the same time providing a cage which will be fully capable of satisfying the severe demands that will be made upon it, and which will not be deformed or injured by the heat produced in the bearing during operation or due to the effect of the lubricant.

These, as well as other objects of the invention which will appear more fully hereafter, are attained by making the cage from a plurality of wood laminae positively interconnected to form the rigid body of the cage. The cage made in this manner is adapted for use with all types of rolling elements such as balls, cylindrical rollers, tapered rollers, barrel-shaped rollers and the like. It is also suitable for all types of roller bearings, that is to say for radially or axially loaded bearings and so forth. Nor is the cage according to the invention confined to a particular cross sectional shape; it may be constructed with any desired cross section.

Further objects of the invention are to provide methods of manufacturing cages in accordance with the invention and such methods will be more fully described hereafter.

Constitutional examples of the cage according to the invention are illustrated diagrammatically in the accompanying drawing, in which individual parts are shown greatly enlarged, and in which:

Fig. 1 is a cross-sectional illustration of one construction of cage,

Fig. 2 is an end view of the rough part or stock from which the cage according to Fig. 1 is made, Fig. 3 is a cross-sectional illustration of another construction of cage, Fig. 4 is a face view of the stock from which the cage according to Fig. 3 is made, the outer lamina being partly removed to expose the lamina next below, and Fig. 5 illustrates a detail on a greatly enlarged scale.

In the construction according to Fig. 1, $a$ is the shaft, on which the inner race $b$ is fixed. Opposite this race is the outer race $c$, which is attached to the case $d$ of the bearing. Between the races $b$ and $c$ runs the roller element $e$ which in the examples illustrated is a cylindrical roller, but might also be a ball, a tapered roller or other form of roller element. The rollers $e$ are held together by the cage $f$ whose function is to hold the individual rollers in proper spaced relation to one another and to ensure the proper positioning of the rollers.

In accordance with the invention the cage $f$ is composed of laminated wood. In the example illustrated in Fig. 1 the laminae are cylinders lying parallel to the axis of the shaft.

As is shown in Fig. 2, foils of wood constituting thin laminae, which are cut in known manner on a peeling or veneering machine, are wound in the form of a tube. The tube can be wound from a single long lamina of wood, or can be built up of a plurality of separate laminae. The thin laminae of wood are impregnated with a binding medium which holds the separate layers together. The cages $f$ can then be cut from the cylinder $g$ thus formed and machined as necessitated by the rollers. The cylinder $g$ can also be made by assembling a plurality of thin laminae of wood in such a way that the fibres of the individual laminae run in different directions. Thus the fibres intersect and very great strength is imparted to the cage.

In the example according to Fig. 3 the cage $h$ consists of individual wood laminae that are in planes at right angles to the axis of the bearing.

Fig. 4 shows the stock from which this cage $h$ is made. There is seen on the left in Fig. 4 a thin wood lamina $i$ whose grain runs from top to bottom, and underneath it a wood lamina $k$ whose grains runs from right to left. A wood lamina may also be inserted whose grain runs obliquely. The individual laminae are again united by means of a binding medium to produce a sheet whose thickness is equal to the width of the cage $h$. The cage is then worked, for example sawn, from this sheet and then finished off and turned to shape.

Fig. 5 shows on a greatly enlarged scale a particularly advantageous embodiment of the invention. The wood laminae are cut so thin that the cells 1 of the wood are open at the surface of the laminae. Thus when the individual laminae are assembled together the binding medium or glue $m$ penetrates into these cells and fills them, and in this way the adhesion of the individual wood laminae or laminations is extraordinarily enhanced. The wood does not undergo any change of shape in actual use even when great temperature differences occur and the bearing is fed with a large amount of oil. Nevertheless, the wood retains a certain absorbency, so that the open cells can absorb some of the lubricant. Consequently the cage becomes to a certain extent self-lubricating.

In cases where the individual laminae of wood are assembled cross-wise and pressed together, extremely great strength is imparted to the cage. In addition the cost of manufacture of the rough material or stock and the finished cage is very low as compared with the known metal cages.

The cages according to the invention may also be constructed in such a way as to rest on the lateral rims of the races alongside the roller elements. In this way the cages are guided by the rims of the inner or the outer race.

I claim:

1. A cage for rolling elements of an anti-friction bearing, said cage being composed of a plurality of wood laminae, each constructed of uninterrupted unbroken wood sections extending throughout the entire dimensions of the cage, and a binder uniting the sections.

2. A cage according to claim 1 said cage being composed of a plurality of wood laminae which are formed as cylinders arranged coaxially one within another.

3. A cage according to claim 1 said cage being composed of a plurality of wood laminae which are formed as rings arranged coaxially side by side.

4. A cage according to claim 1 said cage being composed of at least one wood lamina wound to form a plurality of convolutions winding coaxially one around another.

5. A cage for rolling elements of an anti-friction bearing, said cage being composed of a plurality of wood laminae, each constructed of uninterrupted unbroken sections of wood extending throughout the entire dimensions of the cage, and means for securing the sections together as a unit, the individual laminae being so thin that most of the cells in the wood are open at the surface of each lamina.

6. A cage according to claim 1, wherein the fibers of the individual and immediately adjacent laminae extend in different directions.

ERNST SCHACK.